Figure 3:
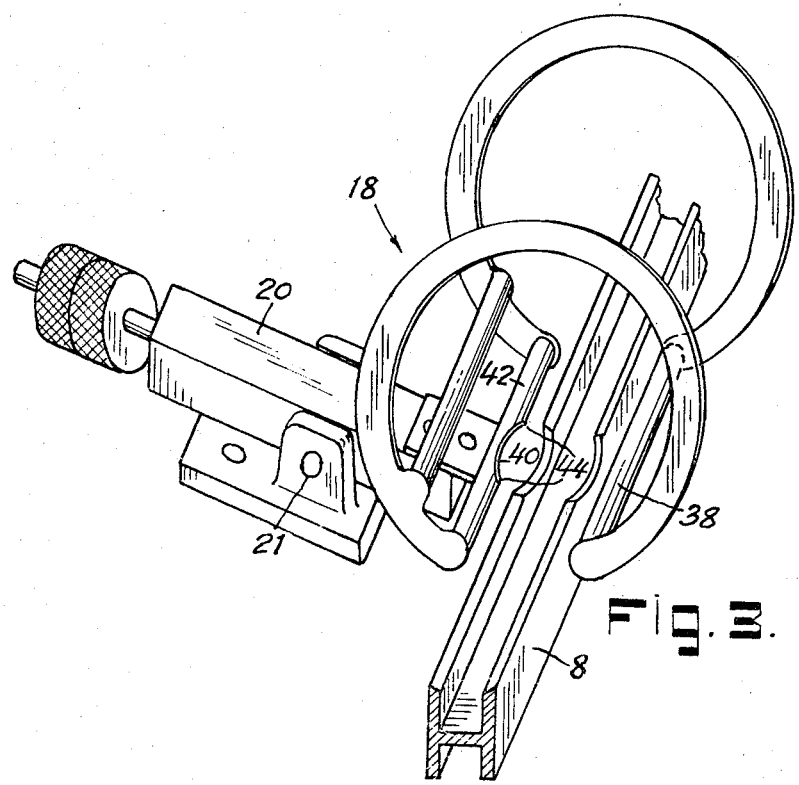

Oct. 31, 1967     O. C. NIEDERER ET AL     3,349,907
EGG GRADER
Original Filed Jan. 22, 1963     2 Sheets-Sheet 1
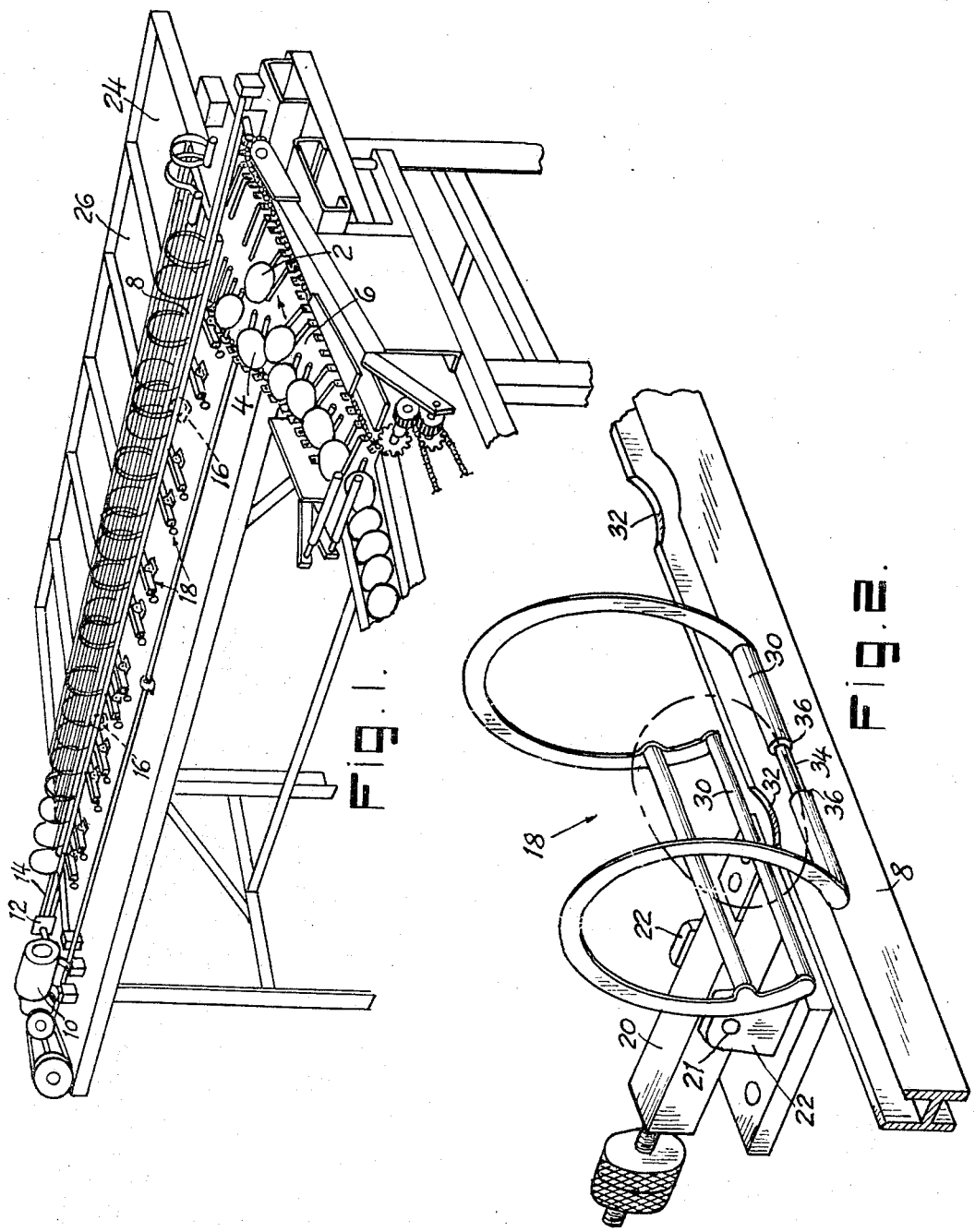
INVENTORS
OTTO C. NIEDERER
HERBERT O. NIEDERER
Sperry and Zoda
ATTORNEY Oct. 31, 1967  O. C. NIEDERER ET AL  3,349,907
EGG GRADER Original Filed Jan. 22, 1963

2 Sheets-Sheet 2

INVENTORS
OTTO C. NIEDERER
HERBERT O. NIEDERER
Sperry and Zoda
ATTORNEY 3,349,907
EGG GRADER
Otto C. Niederer, Bear Tavern Road, and Herbert O. Niederer, Church Road, both of Titusville, N.J. 08560
Continuation of application Ser. No. 253,098, Jan. 22, 1963. This application Oct. 11, 1965, Ser. No. 494,415
3 Claims. (Cl. 209—121)

This invention relates to egg-grading equipment and is a continuation of co-pending application Ser. No. 253,098, filed Jan. 22, 1963, and now abandoned.

The egg grader shown and described in said co-pending application is designed to handle large numbers of eggs in a relatively high speed operation as is required in modern plants such as egg auctions, cooperative plants and wholesale establishments. For this purpose, the egg grader is of the general type shown in U.S. Patents Nos. 2,246,597 and 3,077,257. However, even when using such an egg grader, it has not been possible heretofore to speed up the grading of eggs appreciably when using balance beams which are accurately adjusted to tilt and discharge eggs of a predetermined weight. One of the causes for the delays encountered in such weighing operations is due to the tendency for the eggs to roll or rock about on the conveyor bar on which they are supported when the bar is moved rapidly and in a horizontal direction in conveying the eggs from one weighing device to another.

Another and even more serious cause for delays and inaccuracy in the grading of eggs at high speed is due to the tendency for the eggs to roll or rock back and forth on the rails by which they are supported on the balance beam. This problem is particularly troublesome when an egg is relatively short and round, since it is most desirable for the eggs to be held substantially motionless during the weighing operation in order to assure the desired accuracy in grading. Moreover, if an egg is displaced a substantial distance from the center of the rails on the balance beam, the response of the balance beam may be delayed or inaccurate. Furthermore, in every case where the egg is of border-line weight, the response of the scale tends to be slow and deliberate.

In accordance with the present invention, the transfer bar by which the eggs being graded are moved from one position to another is provided with depressions or other means which prevent or reduce the rocking, rolling, or longitudinal movement of eggs with respect thereto. Moreover, the rails secured to the balance beam of the scales employed are provided with means presenting specific points of support or contact with the eggs deposited thereon so that the eggs will not rock or move appreciably after they are deposited on the rails and the location of the eggs with respect to the balance beam is not variable during a weighing operation and is more positively established.

In this way, the eggs being graded are caused to assume and remain in substantially fixed positions with respect to the egg transferring means and the balance beams, and rocking or longitudinal dislocation of the eggs is reduced so that the speed at which they are moved and weighed can be increased materially.

Accordingly, the principal objects of the present invention are to increase the speed at which eggs may be graded while maintaining the desired accuracy of the grading operation, to reduce the relative movement of eggs with respect to the members by which they are supported during the grading of eggs, and to provide improved egg-transferring and egg-receiving means employed in grading eggs by weight.

These and other objects and features of the present invention will appear from the following description thereof wherein reference is made to the figures of the accompanying drawings.

Figure 4:
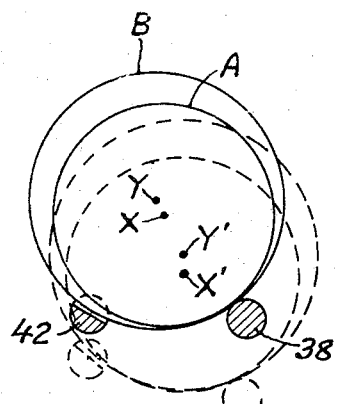
Figure 5:
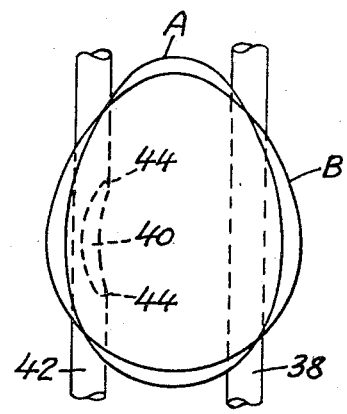

In the drawings:
FIG. 1 is a perspective showing a typical form of egg grader in which the present invention may be embodied;
FIG. 2 is a perspective illustrating portions of the egg transfer means and egg-weighing scale employed in the egg-grading equipment illustrated in FIG. 1;
FIG. 3 is a perspective illustrating an alternative form of egg-weighing scale embodying the present invention;
FIG. 4 is a vertical sectional view through the portion of the weighing scale shown in FIG. 3; and
FIG. 5 is a plan view of the construction shown in FIGS. 3 and 4.

In that form of the invention chosen for purposes of illustration in FIGS. 1 and 2 of the drawings, the egg grader is of a multiple type wherein two rows of eggs indicated at 2 and 4 are movable along inclined channel means 6 to positions in which they may be picked up and advanced by a conveyor bar 8. The conveyor bar is moved in an elliptical path by a motor 10. For this purpose, the crank 12 driven by the motor 10 is connected to the conveyor bar 8 by a link 14; whereas, the vertical movement of the conveyor bar is effected by the operation of rocking members 16 which are also actuated by the motor 10.

The construction thus provided serves to lift eggs from the upper ends of the inclined channels 6 and advance them to the weighing devices 18. Each weighing device is provided with a balance beam 20 movable on pivots supported by the standards 22. The balance beams are adjusted to respond to progressively decreasing weights so that the heaviest eggs will be discharged onto the first collecting tray 24 by tilting of the balance beams of the first group of weighing devices. The lighter eggs do not cause the balance beams to tilt and, therefore, are picked up by the conveyor bar 8 and moved on to the next group of weighing devices. If the eggs are of the proper weight, they will then be discharged onto the next collecting tray 26, whereas, smaller or lighter eggs are then moved on to other weighing devices located along the path of movement of the conveyor bar 8.

In order to permit the eggs to be graded rapidly, the conveyor bar 8 must be moved at rather high speed, and in practice, the eggs tend to rock or to roll lengthwise of the conveyor bar during the longitudinal movement whereby they may be displaced or off-center when the conveyor bar moves downward to deposit the eggs on the parallel rails 30 mounted on the ends of the balance beams 20. This difficulty increases greatly as the speed of movement of the conveyor bar is increased and may even cause relatively round eggs to roll a sufficient distance lengthwise of the conveyor bar to miss a weighing device completely or to roll sideways off the conveyor bar.

In order to reduce or prevent such displacement of eggs relative to the conveyor bar, the bar is preferably provided with recesses, concavities, or other egg-holding or positioning means 32 which serve to hold the eggs carried thereby in positions which are centered with respect to the egg-supply channels upon upward movement of the conveyor bar and centered with respect to the rails 30 of the weighing devices upon downward movement of the conveyor bar. The eggs are thereby held against undesired longitudinal movement relative to the conveyor bar even though the longitudinal movement of the bar is greatly accelerated.

Even when the eggs are accurately positioned and held on the conveyor bar 8, they frequently rock or roll lengthwise of the rails 30 of the weighing devices 18. However, in accordance with the present invention, one of the rails 30 of the weighing devices is formed to position and hold the eggs deposited on the rails so that they will not rock or be displaced. The weighing device can, therefore, be released more promptly after it receives an egg and need not be held inactive for the usual period allowed to permit the eggs to become stable.

As shown in FIG. 2, one of the rails 30 is provided with a reduced portion 34 which presents corners or edges 36 located intermediate the ends of the rails. Therefore, whenever an egg is deposited on the rails, it will engage the edges 36 so as to rest upon spaced points which prevent rocking or rolling of the eggs lengthwise of the rails. Each egg will thus be accurately positioned and held still immediately upon placement thereof on the rails. Thereafter the weighing operation may proceed in the usual manner to grade the egg by weight or to hold it in a fixed position so that it will be received and held by the recess or holding means 32 on the conveyor bar 8 during the next cycle of operation.

When holding means, such as the edges 36 of the reduced portion 34 of a rail 30, are provided on only one of the rails as shown, such holding means may be presented on the rail 30 which is farthest removed from the pivot means of the balance beam 20 as shown in FIG. 2. In the alternative, as shown in FIGS. 3, 4 and 5, it is sometimes desirable and may even be preferable to provide the weighing device with egg-holding means such as a recess 40 in the egg-supporting rail 42 which is closest to the pivot means about which the balance beam is tiltable.

When using either form of the invention, the cooperating spaced egg supporting rails on the balance beam on which the eggs to be weighed are deposited, are formed so that the eggs are caused to rest on three spaced points for support. With this construction, when the eggs are being lowered into position on the rails of the weighing device, any twisted or displaced egg will tend to engage one, or perhaps two, points of support before engaging the third point of support on the rails. Accordingly, for a brief interval of time, the eggs are free to shift or move into a weighing position wherein their long axes are parallel to the egg-supporting rails. Thereafter, when the eggs are fully lowered onto the weighing device and supported against movement at three points thereon, they will not only be held against rocking or rolling relative to the rails of the weighing device but will also be properly oriented and positioned for consistent and accurate weighing thereof.

That form of the invention shown in FIG. 2 has certain alvantages, particularly when the eggs being weighed are substantially consistent in shape, as when they are obtained from a single flock of chickens of the same strain. As there shown, the rail 30 which is farthest removed from the pivot point about which the balance beam 20 is tiltable, is reduced in diameter at the midportion 34 thereof, to present spaced egg-supporting points 36. Eggs lowered onto the rails of the weighing device by the conveyor bar 8 are thereby properly oriented and held against rocking movement to permit immediate and accurate weighing thereof. Moreover, as the balance beam 20 and the rails 30 tilt, the eggs may be discharged more readily from the weighing device whereby "borderline" eggs which cause the balance beam to tilt relatively slowly will nevertheless be discharged promptly so as to speed up the weighing operation.

The alternative construction shown in FIGS. 3, 4 and 5, is found in many cases to be preferred, particularly when the eggs to be graded are received from various sources and from various strains of birds. It is then found that the shape of the eggs may vary considerably even though they may be of the same weight. For example, experience has shown that the eggs obtained from one strain of birds are consistently relatively long and correspondingly smaller in diameter, whereas the eggs obtained from another strain of birds may be considerably shorter. Thus, eggs may vary by as much as ¼ inch in their diameter while still having the same weight per dozen and, therefore, being of the same "size" as established by most standards and regulations and as determined by egg grading equipment which grade eggs by weight. Moreover, the center of gravity of eggs which are relatively large in diameter will be elevated above the front egg-supporting rail of the balance a greater distance than the center of gravity of a longer egg of smaller diameter. As a result, the shorter rounder eggs will tend to be discharged from the weighing device upon tilting of the balance beam through a lesser angle than is required for effecting the discharge of an egg of smaller diameter, the accuracy of the weighing operation is often influenced by the shape of the eggs being graded.

Accordingly, when eggs which vary considerably in diameter or shape are to be graded, the rails of the weighing device, as shown in FIGS. 3, 4 and 5, may be employed. As there shown, the rail 38 which is farthest removed from the pivot point of the balance beam 20 is preferably uniform in diameter so as to provide only a single point of contact with an egg deposited thereon. The inner rail 42 which is closer to the pivot 21 of the balance beam 20 is then formed with a recess 40 or portion of reduced diameter to present two spaced points of support 44 engageable by an egg to be weighed.

With this construction, an egg A which is relatively long but of small diameter will engage the points of support 44 on the inner rail 42 and be positioned with its center of gravity X substantially centered between the rails 38 and 42. On the other hand, an egg B which is shorter and rounder and therefore larger in diameter, will extend farther into the recess 40 between the points of support 44 on the inner rail 42. The rounder egg B will thus be caused to move inward or rearwardly a short distance toward the pivot point of the balance beam 20. Its center of gravity Y will also be located somewhat further rearwardly from the rail 38 of the weighing device than the center of gravity X of the elongated egg A. Its center of gravity Y will still be located above the center of gravity X of the egg A but it will also be located somewhat farther rearwardly from the front rail 38 of the weighing device. Thereafter on tilting of the balance beam 20 and the egg-supporting rails 38 and 42 thereof to the dotted line position of FIG. 4, the center of gravity of either the elongated egg A and that of the rounded egg B will be moved to positions as indicated at $X''$ and $Y'$ in substantial vertical alignment above the front rail 38. The eggs, whatever their shape, will therefore be discharged from the weighing device upon tilting of the balance beam through substantially the same angle. The uniformity and accuracy of the weighing operation is therefore increased whereby the equipment may be used to grade eggs which differ considerably in shape.

In each of the alternative forms of the invention shown in the drawings the three point contact between the egg and the supporting rails of the weighing device serves to prevent rocking of the eggs deposited thereon while permitting limited orientation or adjustment in the position of the eggs with respect to the weighing device as the eggs are deposited on the rails. This action, together with the greater uniformity in the weighing operation afforded by the novel construction, renders it possible to speed up the equipment and increase its egg grading capacity very greatly.

While the equipment shown and described has two egg-feeding channels for directing eggs to the conveyor bar 8, the invention may be employed when any desired number of eggs are supplied to and advanced by the conveyor bar on each cycle of operation.

It will also be apparent that the egg grading equipment may be provided with any preferred form or type of locking means for the weighing devices as exemplified by the construction shown in U.S. Patent No. 2,692,133. Similarly, if desired, the conveyor bar may have egg-discharge means such as that shown in U.S. Patent No. 2,646,168. Moreover, the invention may be used in combination with other forms and types of egg-grading equipment and when employing other driving and timing means for controlling the movement of the conveyor bar.

In view thereof, it will be apparent that numerous changes and modifications may be made in the form, construction, arrangement and combination of the elements understood that the particular embodiment of the invention shown in the drawings and described above is intended to be illustrative only and is not intended to limit the scope of the invention.

We claim:

1. Egg-grading equipment embodying a plurality of weighing devices spaced apart longitudinally of the equipment, each of said weighing devices being provided with a balance beam having a pivot about which it is movable and having two spaced egg-receiving members secured to the balance beam adjacent one end thereof, egg-moving means movable in an elliptical path and in a vertical plane between the spaced members secured to the balance beam and above and below said members for advancing eggs from one of said weighing devices to another, said egg-moving means presenting an upwardly facing surface with elements thereon for opposing longitudinal movement of eggs relative to said means during longitudinal movement of the egg-moving means, said elements being positioned to register with the spaced members on the balance beams upon movement of the egg-moving means vertically between said members, the spaced egg-receiving members secured to the balance beams being in the form of parallel rails, the rail which is farther from the pivot of the balance beam being of substantially uniform diameter near the central portion thereof and the other rail having a central portion with a cavity therein presenting spaced points engageable by eggs deposited on said rails whereby said rails cooperate to present three points of contact with an egg, two of which points of contact are spaced a lesser distance from the pivot about which the balance beam is movable than is the other point of contact.

2. Egg-grading equipment embodying a plurality of weighing devices spaced apart longitudinally of the equipment, each of said weighing devices being provided with a balance beam having a pivot about which it is movable and having two spaced egg-receiving members secured to the balance beam adjacent one end thereof, egg-moving means movable in an elliptical path and in a vertical plane between the spaced members secured to the balance beam and above and below said members for advancing eggs from one of said weighing devices to another, said egg-moving means presenting an upwardly facing surface with elements thereon for opposing longitudinal movement of eggs relative to said means during longitudinal movement of the egg-moving means, said elements being positioned to register with the spaced members on the balance beams upon movement of the egg-moving means vertically between said members, the spaced egg-receiving members secured to the balance beams being in the form of parallel rails, the rail which is closer to the pivot of the balance beam being of substantially uniform diameter near the central portion thereof and the other rail having a central portion with a cavity therein presenting spaced points engageable by eggs deposited on said rails whereby said rails cooperate to present three points of contact with an egg, two of which points of contact are spaced a greater distance from the pivot about which the balance beam is movable than is the other point of contact.

3. Egg-grading equipment embodying a plurality of weighing devices spaced apart longitudinally of the equipment, each of said weghing devices being provided with a balance beam having a pivot about which it is movable and having two spaced egg-receiving members secured to the balance beam adjacent one end thereof, egg-moving means movable in an elliptical path and in a vertical plane between the spaced members secured to the balance beam and above and below said members for advancing eggs from one of said weighing devices to another, said egg-moving means presenting an upwardly facing surface with elements thereon for opposing longitudinal movement of egg relative to said means during longitudinal movement of the egg-moving means, said elements being positioned to register with the spaced members on the balance beams upon movement of the egg-moving means vertically between said members, the spaced egg-receiving members secured to the balance beams being in the form of parallel rails, one of said rails being substantially uniform in diameter near the central portion thereof and the other of said rails having a central portion with a cavity therein presenting two spaced points engageable by eggs deposited on said rails whereby said rails cooperate to present three points of contact with each egg supported thereby two of which points are located on one of said rails and spaced a predetermined distance from the pivot about which said balance beam is movable and the other of said points being located on the other of said rails and spaced a different distance from the pivot about which said balance beam is movable.

References Cited

UNITED STATES PATENTS

| | | | |
|---|---|---|---|
| 1,875,811 | 9/1932 | Hilgers | 209—121 X |
| 2,461,308 | 2/1949 | Brown | 209—121 |
| 2,692,133 | 10/1954 | Niederer | 209—121 |
| 3,010,578 | 11/1961 | Butterfield | 209—121 |

ROBERT B. REEVES, *Primary Examiner.*